(12) United States Patent
Hasegawa et al.

(10) Patent No.: US 8,577,147 B2
(45) Date of Patent: Nov. 5, 2013

(54) CHARACTER RECOGNITION APPARATUS AND CHARACTER RECOGNITION METHOD

(75) Inventors: Shohei Hasegawa, Inagi (JP); Shinichi Eguchi, Inagi (JP); Hajime Kawashima, Inagi (JP); Koichi Kanamoto, Inagi (JP); Hiroki Inoue, Inagi (JP); Maki Yabuki, Inagi (JP); Katsutoshi Kobara, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 125 days.

(21) Appl. No.: 13/150,743

(22) Filed: Jun. 1, 2011

(65) Prior Publication Data

US 2011/0229037 A1    Sep. 22, 2011

Related U.S. Application Data

(63) Continuation of application No. PCT/JP2009/001514, filed on Mar. 31, 2009.

(51) Int. Cl.
*G06K 9/18* (2006.01)
*G06K 9/48* (2006.01)

(52) U.S. Cl.
USPC .................................. 382/182; 382/199

(58) Field of Classification Search
USPC .................. 382/182, 199, 209, 195
See application file for complete search history.

(56) References Cited

U.S. PATENT DOCUMENTS

| | | | |
|---|---|---|---|
| 5,387,109 A | 2/1995 | Ishikawa et al. | |
| 6,754,385 B2 * | 6/2004 | Katsuyama | 382/171 |
| 6,917,706 B2 * | 7/2005 | Katsuyama | 382/173 |
| 7,039,235 B1 * | 5/2006 | Katsuyama | 382/195 |
| 2005/0201620 A1 * | 9/2005 | Kanamoto et al. | 382/182 |
| 2005/0226510 A1 * | 10/2005 | Eguchi et al. | 382/199 |
| 2008/0056576 A1 | 3/2008 | Takebe et al. | |

FOREIGN PATENT DOCUMENTS

| | | | |
|---|---|---|---|
| EP | 0 576 838 | | 1/1994 |
| JP | 61-175880 | | 8/1986 |
| JP | 5-189606 | | 7/1993 |
| JP | 2005-189606 | * | 7/1993 |
| JP | 10-097588 | | 4/1998 |
| JP | 11-085906 | * | 3/1999 |
| JP | 11-242716 | | 9/1999 |
| JP | 2008-59298 | | 3/2008 |

OTHER PUBLICATIONS

International Search Report issued in PCT/JP2009/001514, mailed May 12, 2009.
Japanese Office Action issued in co-pending Japanese App. No. 2011-506849, mailed Feb. 19, 2013 (with partial translation).

* cited by examiner

*Primary Examiner* — Aaron W Carter
(74) *Attorney, Agent, or Firm* — Greer, Burns & Crain, Ltd

(57) ABSTRACT

An objective is to eliminate dotted lines in a character box in image data to increase the character recognition rate. There are some cases in which a dotted line candidate cannot be extracted due to many overlapping parts of dotted lines and characters or due to a blurry part in a dotted line. In such cases, the position of a dotted line candidate is estimated referring to features such as the interval, length, width, etc. of a dotted line candidate in the same character box (or in a character box for another relevant item), and image data of the estimated position and image data of a previously extracted dotted line (or a reference dotted line) are compared to determine whether or not they are an identical dotted line.

6 Claims, 19 Drawing Sheets

FIG. 2A

| BANK NAME | BRANCH NAME | . . . | AMOUNT |
|---|---|---|---|
| | | | 123,456 |
| | | | 987,654 |
| | | | |

- DOTTED LINE INFORMATION IS MISSING DUE TO MISALIGNED PRINTING. BLUR MAY ALSO OCCUR DO TO SMALL SIZE. DIFFICULT TO EXTRACT DOTTED LINE WITH ONLY ONE ITEM.
- SAME TYPE (SAME SIZE, PITCH, THICKNESS, COLOR, ETC.) OF DOTTED LINE FOR ALL ITEMS 1, 2, 3

FIG. 2B

| AMOUNT | 97865432 |
|---|---|
| HANDLING CHARGE | |

| PAYEE | XX TRADING, Inc. |
|---|---|
| | XX TRADING, Inc. |
| PAYER | ~~FUJITSU TARO~~ |
| | FUJITSU TARO |

- SAME TYPE OF DOTTED LINE FOR DIFFERENT ITEMS. WHEN RECOGNIZING PAYER, DOTTED LINE INFORMATION FOR PAYEE CAN BE USED.
- SAME TYPE OF DOTTED LINE FOR DIFFERENT ITEMS. WHEN RECOGNIZING AMOUNT SECTION, DOTTED LINE INFORMATION FOR HANDLING CHARGE CAN BE USED.
- DIFFERENT TYPES OF DOTTED LINES BUT GROUPING WITHIN THE SAME FORM CAN BE PERFORMED.

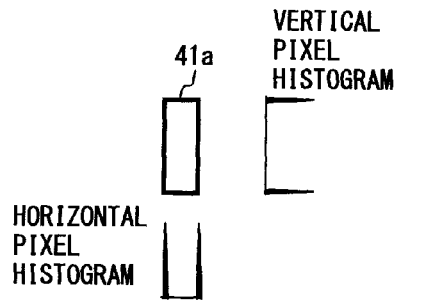

FIG. 6A

VERTICAL DIRECTION:
NO DOTTED LINE CANDIDATE
HORIZONTAL DIRECTION:
NO DOTTED LINE CANDIDATE

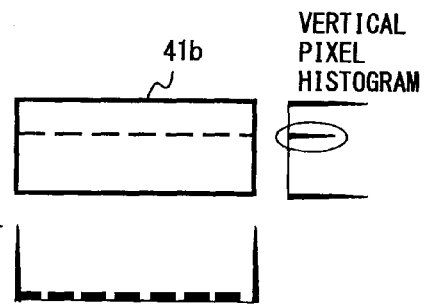

FIG. 6B

VERTICAL DIRECTION:
NO DOTTED LINE CANDIDATE
HORIZONTAL DIRECTION:
DOTTED LINE CANDIDATE PRESENT

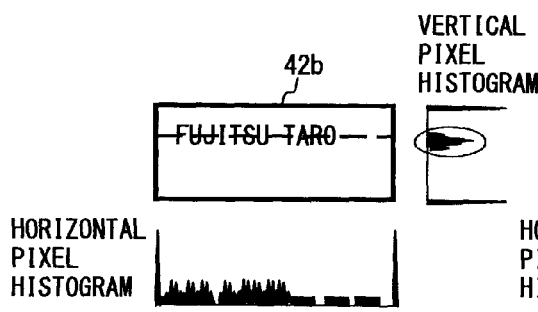

FIG. 6C

VERTICAL DIRECTION:
NO DOTTED LINE CANDIDATE
HORIZONTAL DIRECTION:
DOTTED LINE CANDIDATE PRESENT

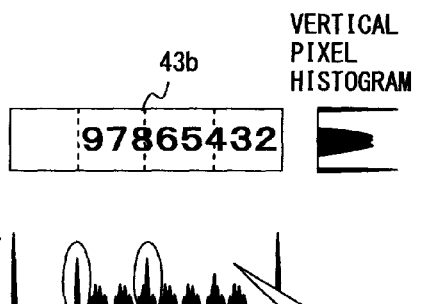

FIG. 6D

VERTICAL DIRECTION:
DOTTED LINE CANDIDATE PRESENT
HORIZONTAL DIRECTION:
NO DOTTED LINE CANDIDATE

MAY BE BLURRY AND NOT BECOME CANDIDATE SPOT

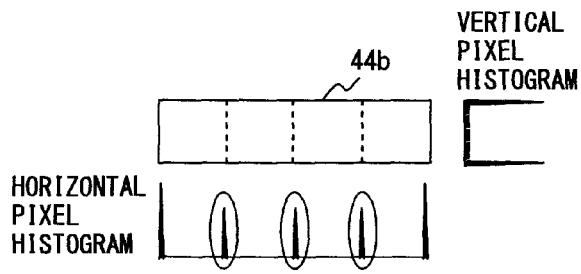

FIG. 6E

VERTICAL DIRECTION:
DOTTED LINE CANDIDATE PRESENT
HORIZONTAL DIRECTION:
NO DOTTED LINE CANDIDATE

| DOT CANDIDATE | PITCH | SIZE | THICKNESS | DOT SHAPE | STARTING COORDINATES | COLOR |
|---|---|---|---|---|---|---|
| CANDIDATE 1 | 3 | 7 | 4 | RECTANGULAR | (x1, y1) | YELLOW |
| CANDIDATE 2 | 2 | 2 | 2 | CIRCULAR | (x2, y2) | YELLOW |
| ~~CANDIDATE 3~~ | ~~3~~ | ~~5~~ | ~~3~~ | ~~RECTANGULAR~~ | | ~~BLACK~~ |
| CANDIDATE 4 | 3 | 7 | 4 | RECTANGULAR | (x4, y4) | YELLOW |
| CANDIDATE 5 | 2 | 3 | 2 | CIRCULAR | (x5, y5) | YELLOW |
| CANDIDATE 6 | 3 | 7 | 4 | RECTANGULAR | (x6, y6) | YELLOW |
| ... | ... | ... | ... | ... | ... | ... |
| CANDIDATE n | ... | ... | ... | ... | ... | ... |

ACCURACY IS IMPROVED BY ESTIMATING SHAPE OF DOT

EXCLUDED FROM CANDIDATE AS EXTRACTION IS MADE FOCUSING ON REPRESENTATIVE VALUE

F I G. 8

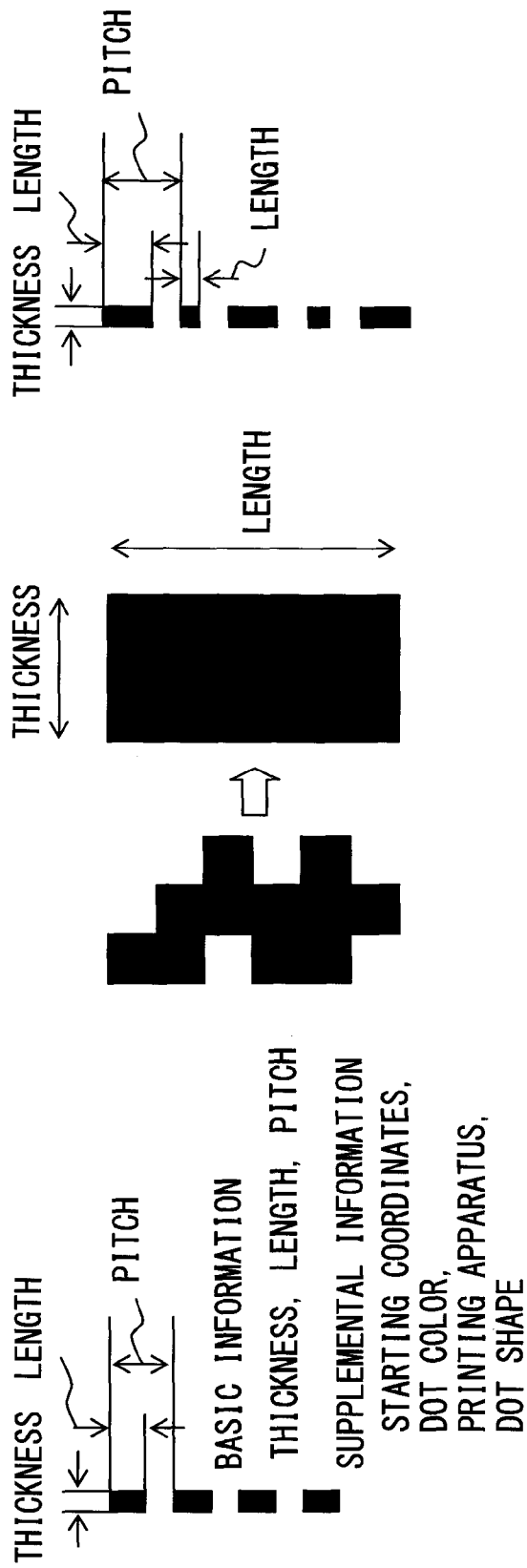

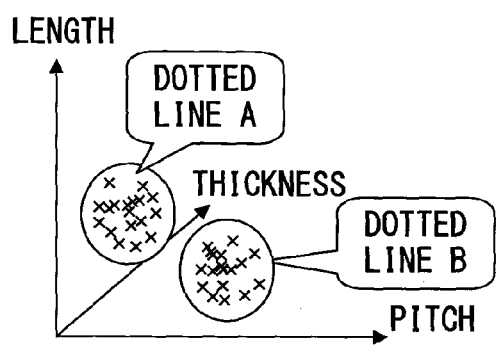
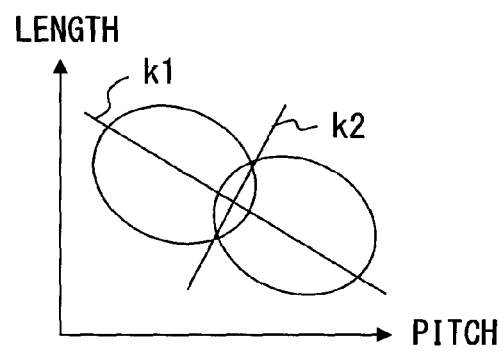
F I G. 1 0 A        F I G. 1 0 B

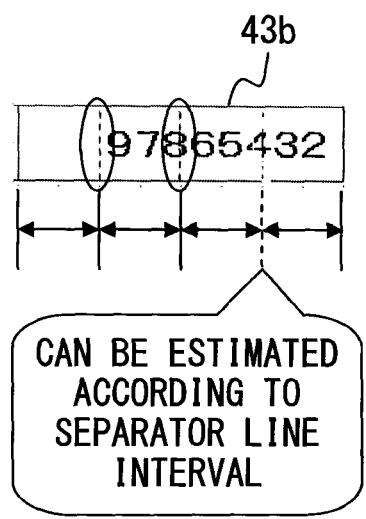
CAN BE ESTIMATED ACCORDING TO SEPARATOR LINE INTERVAL
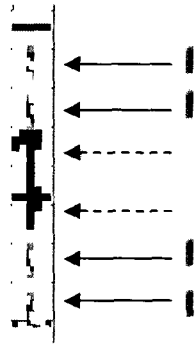
PARTIAL MATCHING IS CONFIRMED AT IMAGE LEVEL
F I G. 1 3 A    F I G. 1 3 B

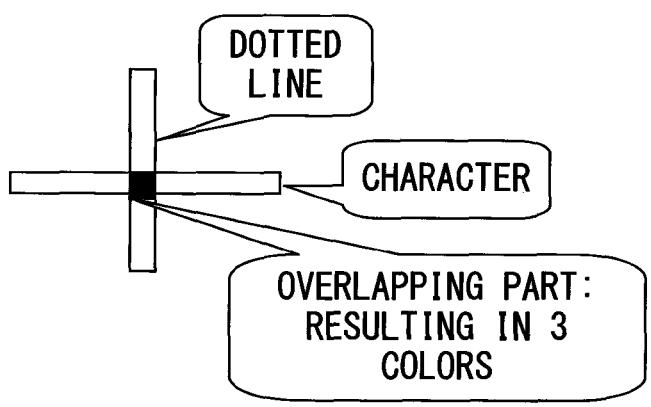
F I G. 1 4 A
97865432
F I G. 1 4 B

| | a1 | a2 | a3 | a4 | a5 | a6 | a7 | a8 | a9 | a10 |
|---|---|---|---|---|---|---|---|---|---|---|
| a1 | – | – | – | – | – | – | – | – | – | – |
| a2 | 30 | – | – | – | – | – | – | – | – | – |
| a3 | 90 | 60 | – | – | – | – | – | – | – | – |
| a4 | 120 | 90 | 30 | – | – | – | – | – | – | – |
| a5 | 135 | 105 | 45 | 15 | – | – | – | – | – | – |
| a6 | 150 | 120 | 60 | 30 | 15 | – | – | – | – | – |
| a7 | 170 | 140 | 80 | 50 | 35 | 20 | – | – | – | – |
| a8 | 180 | 150 | 90 | 60 | 45 | 30 | 10 | – | – | – |
| a9 | 210 | 180 | 120 | 90 | 75 | 60 | 40 | 30 | – | – |
| a10 | 270 | 240 | 180 | 150 | 135 | 120 | 110 | 90 | 60 | – |

| | 10 | 11 | 13 | 15 | 16 | 17 | 20 | 22 | 23 | 25 | 26 | 30 | 35 | 36 | 37 | 40 | 45 | 46 | 50 | 52 | 55 | 56 | 60 | 67 | 70 | 75 | 80 |
|---|---|---|---|---|---|---|---|---|---|---|---|---|---|---|---|---|---|---|---|---|---|---|---|---|---|---|---|
| 1/1 | 1 | | | 2 | | | 1 | | | | | 5 | 1 | | | 1 | 2 | | 1 | | | | | | 1 | 1 | 1 |
| 1/2 | 2 | | 10 | 10 | | 2 | 2 | 4 | | 2 | | | | | 2 | 1 | 10 | | | 2 | 2 | | 6 | 4 | 2 | | |
| 1/3 | 15 | 3 | 3 | 6 | 3 | | 18 | | 3 | 3 | 3 | 12 | 3 | 3 | | 12 | 6 | 3 | 9 | | | 3 | 8 | | 3 | 6 | 3 |
| TOTAL | 18 | 3 | 13 | 18 | 3 | 2 | 21 | 4 | 3 | 5 | 3 | 32 | 4 | 3 | 2 | 14 | 18 | 3 | 10 | 2 | 2 | 3 | 23 | 4 | 6 | 7 | 4 |

| | 85 | 90 | 105 | 110 | 120 | 135 | 140 | 150 | 170 | 180 | 210 | 240 | 270 |
|---|---|---|---|---|---|---|---|---|---|---|---|---|---|
| 1/1 | | 5 | 1 | 1 | 4 | 2 | 1 | 3 | 1 | 3 | 1 | 1 | 1 |
| 1/2 | 2 | 6 | 2 | | 2 | 2 | | | | | | | |
| 1/3 | | 3 | | | | | | | | | | | |
| TOTAL | 2 | 14 | 3 | 1 | 6 | 4 | 1 | 3 | 1 | 3 | 1 | 1 | 1 |

CHARACTER RECOGNITION APPARATUS AND CHARACTER RECOGNITION METHOD

CROSS-REFERENCE TO RELATED APPLICATIONS

This application is a continuation application of International PCT Application No. PCT/JP2009/001514 which was filed on Mar. 31, 2009.

FIELD

The present invention relates to a character recognition apparatus and a character recognition method to recognize characters on a form and the like.

BACKGROUND

In order to save characters and the like printed or handwritten on a form (such as a slip) as data, character recognition apparatuses that scan a form as a color image by a image scanner and the like and perform recognition of characters in the scanned color image data have been known.

A form has a plurality of items in which characters are printed (or written), with the size, position of the character box of each item being different for each form. Conventionally, the operator needs to prepare definition information that specifies the shape, position, color, and the like of the character box in advance, so that characters in such forms in various formats may be recognized.

However, the method in which definition information is prepared in advance has a problem that the number of operation processes for the operator becomes large.

Patent Document 1 describes that connected components of black pixels in a binary image are sorted into a horizontal line, a vertical line, a character and a broken line element, and when the white ratio being the ratio of a space between two adjacent broken line elements in the horizontal direction to the total length including the space is equal to or below a threshold value, it is determined that the broken line elements may be connected.

Patent Document 2 describes that a rectangle is extracted from a binary image; the number of black pixels in the rectangle is counted; and the number of pixels with respect to the area of the rectangle is calculated as the black pixel occupancy. Then, based on the black pixel occupancy, whether or not the rectangle forms a dotted line is determined.

Patent Document 3 describes that a rectangle of black pixel continuous elements is extracted from a binary image, and a solid line box corresponding to a cell of a table is extracted from the extracted rectangle. Then, a rectangle corresponding to a dotted line element within the solid line box is extracted, and a dotted ruler is extracted by combining dotted line elements within a predetermined distance.

[Patent Document 1] Japanese Laid-open Patent Publication No. S61-175880
[Patent Document 2] Japanese Laid-open Patent Publication No. H10-97588
[Patent Document 3] Japanese Laid-open Patent Publication No. H11-242716

SUMMARY

In a character box of a form in which numbers and the like are written or printed, dotted lines are printed to make the digits easier to view. Since a fine line is usually used for the dotted line, the dotted line may be blurred depending on the printing status. In addition, the printed position of characters may be misaligned and may overlap with the dotted line. In such cases, it becomes impossible to accurately extract the dotted line in the character box. If the dotted line cannot be extracted accurately, it causes a problem that the dotted line cannot be eliminated and the character recognition rate decreases.

A problem of the present invention is to eliminate a dotted line in a character box in image data to increase the character recognition rate.

A character recognition apparatus of the present invention include extraction means extracting a dotted line candidate from image data of a form; feature collection means collecting a thickness, length, interval of a dotted line of a plurality of extracted dotted line candidates as feature information; estimation means estimating a dotted line candidate spot in a character box being a recognition target based on the feature information of a dotted line candidate in a same character box being the recognition target or in another character box; elimination means eliminating the dotted line candidate extracted by the extraction means and the dotted line candidate estimated by the estimation means from the image data; and character recognition means performing recognition of a character in image data from which the dotted line candidate has been eliminated by the elimination means.

According to the present invention, operations to prepare definition information about dotted lines in a character box may be reduced, while securing character recognition accuracy.

Advantageous Effects of Invention

According to the present invention, operations to prepare definition information about dotted lines in a character box may be reduced, while securing character recognition accuracy.

BRIEF DESCRIPTION OF DRAWINGS

FIGS. 2A and 2B are diagrams illustrating an estimation method of dotted lines;
FIGS. 6A, 6B, 6C, 6D and 6E are diagrams presenting examples of pixel histograms;
FIG. 8 is a diagram presenting an example of a secondary feature table of dotted line candidates;
FIGS. 9A, 9B and 9C are diagrams illustrating features of the shape of a dotted line, the shape of a dot, and features of the shape of a broken line, respectively;
FIGS. 10A and 10B are diagrams illustrating a classification method of dotted line candidates;
FIGS. 13A and 13B are diagrams illustrating an estimation method of a blurred dotted line;

FIG. 14A is a diagram presenting an overlapped part of a character and a dotted line;

FIG. 14B is a diagram presenting image data after elimination of dotted lines;

FIG. 19 is a diagram presenting an example of a voting table.

DESCRIPTION OF EMBODIMENTS

Figure 1:
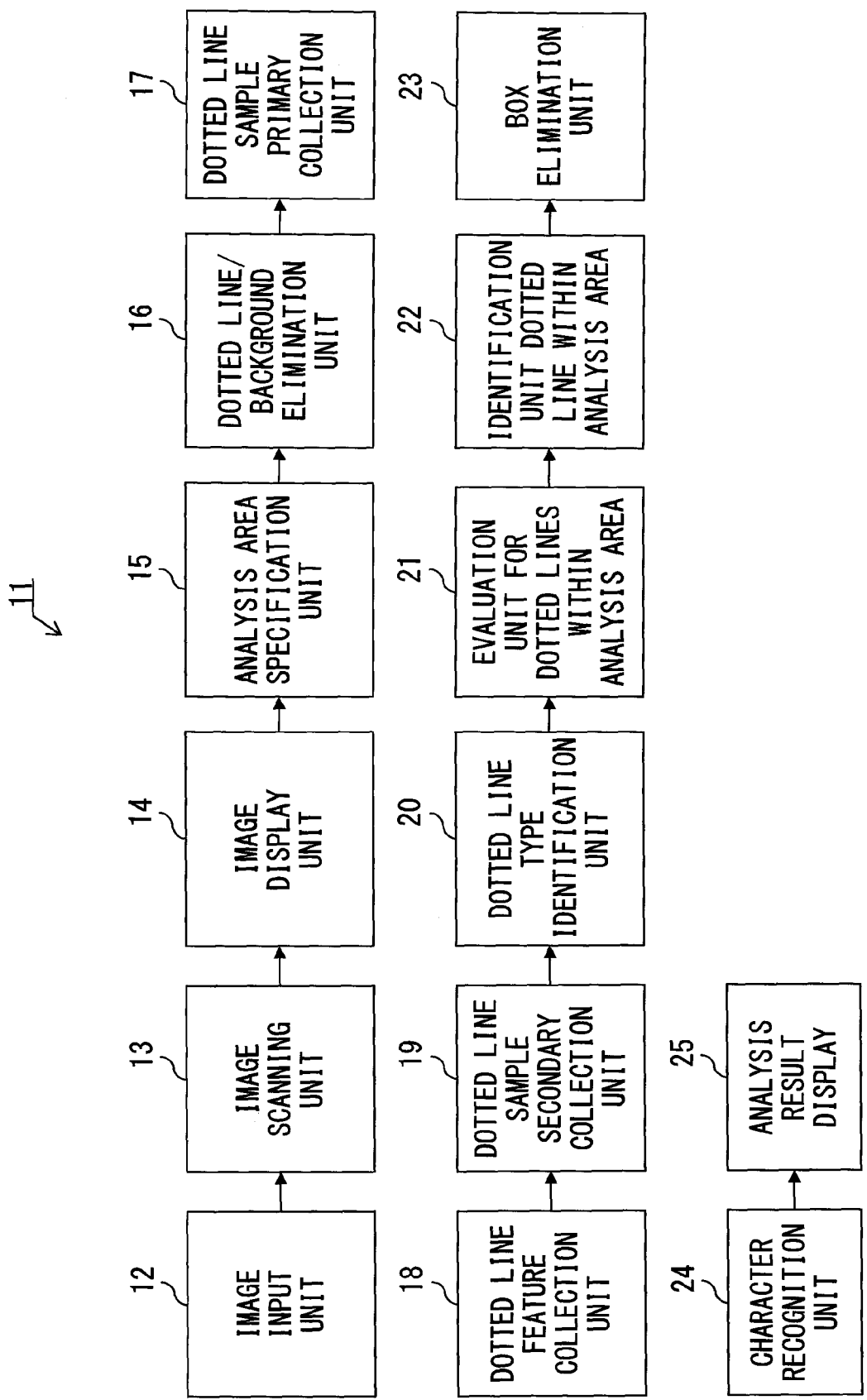
FIG. 1 is a diagram presenting the configuration of a character recognition apparatus of an embodiment.

Hereinafter, preferred embodiments of the present invention are described. FIG. 1 is a diagram illustrating the configuration of a character recognition apparatus 11 of an embodiment. Hereinafter, explanation is made with an example of performing character recognition of characters (including numbers) printed or written in a character box of a form and the like.

An image input unit 12 is a platform and the like of a scanner and the like on which a form and the like being the scanning target is placed. An image scanning unit 13 scans a character box of a form and the like and characters and the like written in the character box as image data. The image scanning unit 13 is, for example, an image sensor and the like of a scanner.

An image display unit 14 is a display apparatus that displays image data scanned by the image scanning unit 13.

An analysis area specification unit 15 is for specifying an analysis target area of image data of a form displayed on the image display unit 14. The analysis area specification unit 15 has, for example, an input unit such as a mouse and a keyboard, and a program that performs control to display the area in image data specified by the input unit on the display unit, and the like.

A dotted line/background elimination unit 16 eliminates the background color and, for example, a dotted line and the like that is out of the recognition target area, from the entirety of the form. A dotted line sample primary collection unit 17 extracts dotted line candidates from the entirety of the form, and saves each of the extracted dotted line candidates in a memory and the like. The primary extraction of dotted line candidates is performed by, for example, creating a pixel histogram. Dotted lines may be extracted by known methods other than the pixel histogram.

A dotted line feature collection unit 18 collects rough features from the dotted line candidates collected by the dotted line sample primary collection unit 17. Feature elements include information such as the length, interval, thickness and the like of dotted lines.

A dotted line sample secondary collection unit 19 collects dotted line candidates in the entirety of the form again, based on the feature information collected by the dotted line feature collection unit 18.

A dotted line type identification unit 20 identifies the type of the plurality of dotted line candidates collected by the secondary collection. The dotted line type identification unit 20 sorts out the plurality of dotted line candidates into some groups according to the distribution of the dotted line candidates and obtains the representative value for each of the groups, for example.

An evaluation unit for dotted lines within analysis area 21 compares and evaluates dotted line candidates within the analysis target area with the shape of the dotted lines identified by the dotted line type identification unit 20.

An identification unit for dotted lines within analysis area 22 identifies the type of the dotted lines based on the evaluation by the dotted-line-within-analysis-area evaluation unit 21.

A box elimination unit 23 eliminates a character box in the recognition target area and dotted lines within the character box. A character recognition unit 24 performs character recognition for image data from which the character box, dotted lines, and the like have been eliminated. An analysis result display unit 25 displays data of the character recognition result.

Meanwhile, the configuration of the character recognition apparatus 11 described above is an example, and the character recognition apparatus 11 does not need to have all the functions described above. For example, the image input unit 12, the image scanning unit 13, the image display unit 14 and the like may be other apparatuses.

Here, an estimation method for the case in which printing of a dotted line of a form and the like is blurry, or a character overlaps with a dotted line are described briefly with reference to FIGS. 2A and 2B.

FIG. 2A presents an example of a case in which, in successive-entry forms on which data of the same items are successively recorded, the printing position of numbers is misaligned and numbers and dotted lines overlap. In this case, since dotted lines and characters overlap, dotted lines cannot be extracted accurately.

In forms in on which data of the same items are printed successively, since the same type of dotted line is used for other items, the missing dotted line may be estimated by using dotted line information (the thickness, length, interval, color, and the like) in other items.

FIG. 2B presents an example of a case of estimating the position of a dotted line according to dotted line information of other items. In a form, the same type of dotted line is often used for other items. Focusing on such a feature of a form, even when a dotted line of a given item cannot by extracted, the position of the dotted line, the thickness, length, and interval of the dotted line may be estimated referring to dotted line information of related other items.

In the example of FIG. 2B, the dotted line in the payer section is estimated referring to the dotted line information for the payee section. Meanwhile, the type of the dotted line in the amount section is estimated according to the feature information of the dotted line in the handling charge section.

Hereinafter, processes to eliminate the position of a dotted line candidate and to eliminate the dotted line to perform character recognition in the case in which, when a form is scanned by a color image scanner and the like, the dotted line cannot be extracted as the dotted line and a character overlap, or the dotted line cannot be extracted as the dotted line is blurry.

Figure 3:
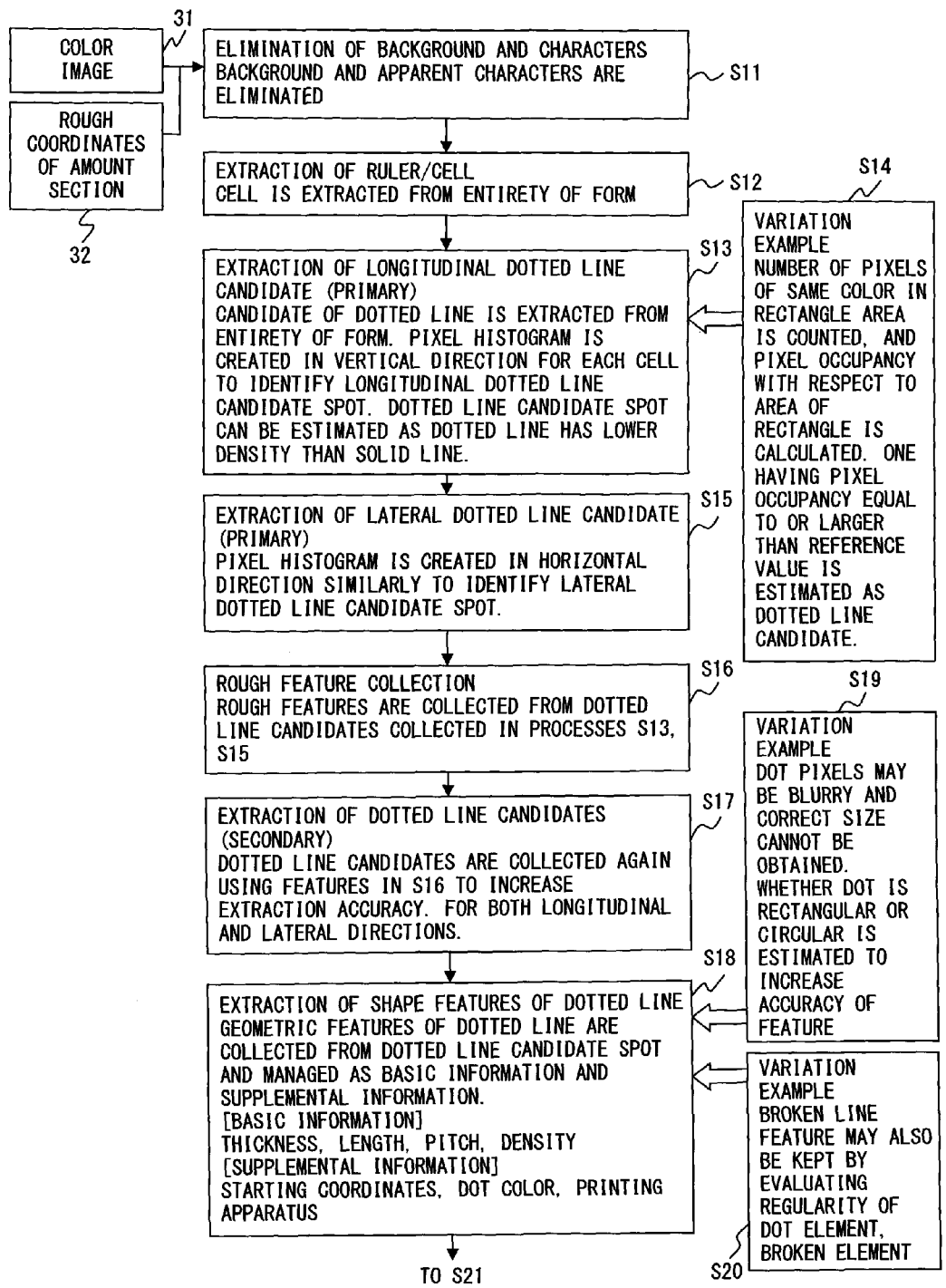
FIG. 3 is a flowchart (1) of a character recognition process in a form.
Figure 4:
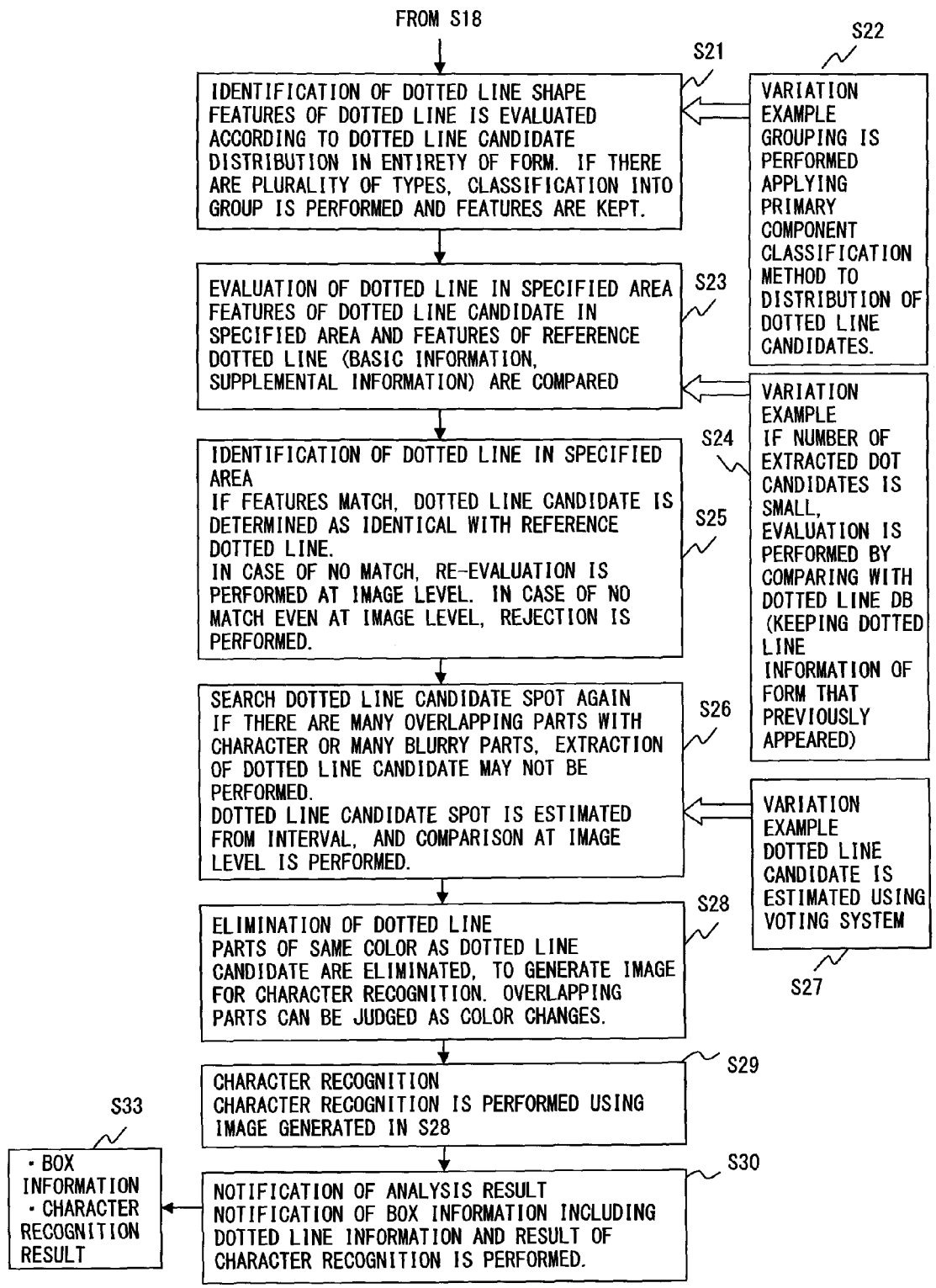
FIG. 4 is a flowchart (2) of a character recognition process in a form.

FIG. 3 and FIG. 4 are flowcharts (1), (2) of a character recognition process of a form.

Color image data 31 of a form scanned by the image scanning unit 13 is obtained, and rough coordinates 32 of the amount section is further obtained. Meanwhile, for the coordinates of the amount section, rough coordinates of the amount may be specified by the user in advance, or in an extraction process of a cell in step S12 described later, the area in which numbers exist may be extracted as the amount section, and the user may check it and confirm the coordinates.

First, the background color and apparent characters are eliminated from the color image data of the form (FIG. 3, S11).

Next, a ruler/cell is extracted in the entirety of the form. As an extraction method of a ruler/cell, for example, solid lines (rulers) being the continuation of pixels of the same color in the color image data are extracted, and a rectangle area enclosed by the solid lines is extracted as a cell.

Figures 5A, 5B, 5C:
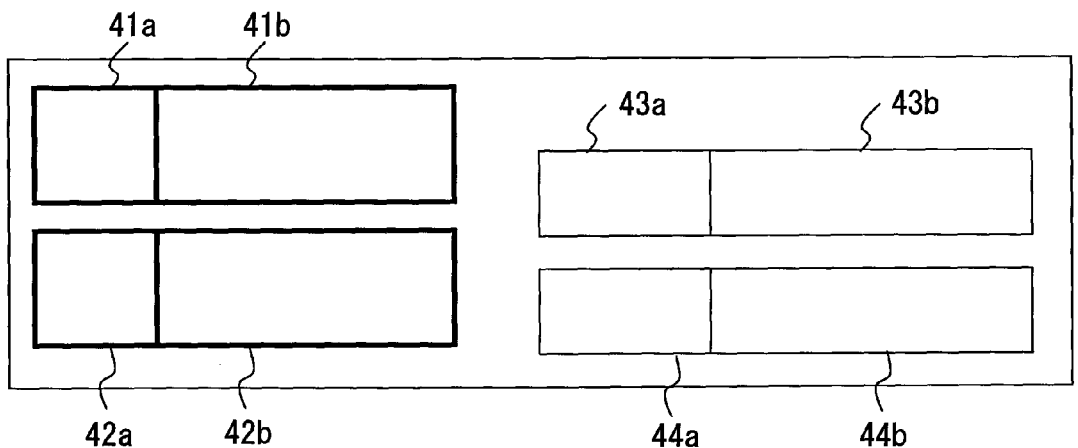
FIGS. 5A, 5B and 5C are diagrams presenting an example of image data of a form.

FIGS. 5A-5C are diagrams presenting color image data of a form (represented in binary expression with white and black in FIG. 5), and image data after processing. FIG. 5A presents image data of a form. FIG. 5B presents image data after the background color/characters are eliminated. FIG. 5C represents cells extracted from the image data.

FIG. 5B is the color image from which the background color and characters have been eliminated, where the name in the payee section has been recognized appropriately as characters and the characters such as "XX Trading" have been eliminated. On the other hand, the Katakana characters in the payer section and the numbers in the amount section are left.

FIG. 5C presents cells extracted from the image data of the form. By the process in step S12 described above, two cells of cells 41*a*, 41*b* have been extracted from the payee section, and two cells of cells 42*a*, 42*b* have also been extracted from the payer section. Meanwhile, two cells of 43*a*, 43*b* have been extracted from the amount section, and two cells of 44*a*, 44*b* have also been extracted from the handling charge section.

Returning to FIG. 3, a dotted line candidate in the longitudinal direction (vertical direction) is extracted (primary extraction of a longitudinal dotted line candidate) (S13). In the process in step S13, for example, a longitudinal dotted line candidate spot is extracted by creating a pixel histogram in the vertical direction for each cell, and the extracted longitudinal dotted line candidate spot is stored in a memory. Since a dotted line has parts with no pixel (parts with while pixels), the created pixel histogram contains fewer pixels than that for a solid line. Accordingly, a dotted line candidate spot may be estimated by creating the pixel histogram.

The method to extract a dotted line candidate is not limited to the method of creating a pixel histogram, and known dotted line extraction techniques may be used. For example, a dotted line candidate spot may be extracted by the process in step S14. In the process in step S14, a rectangle area consisting of a plurality of pixels is extracted from image data, and the number of pixels in the extracted rectangle area is counted to calculate the pixel occupancy with respect to the area of the rectangle. Then, one with the pixel occupancy that is equal to or larger than a reference value is estimated as a dotted line candidate.

In the next step S15, the primary extraction of a lateral dot candidate is performed. In the process in step S15, a pixel histogram for the horizontal direction is created, to identify a lateral dot line candidate spot.

FIGS. 6A-6D are diagrams presenting examples of a pixel histograms created from the image data in FIG. 5A.

FIG. 6A presents the horizontal pixel histogram and the vertical pixel histogram for the cell 41*a* of the payee section in FIGS. 5A and 5C. In this case, the horizontal pixel histogram created by counting the pixels of the same color in the horizontal direction has only the peak values of the pixels of the solid lines on the top and bottom of the cell 41*a*, and it is determined that there is no dotted line candidate spot. In the same manner, the vertical pixel histogram created by counting the pixels of the same color in the vertical direction has only the peak values of the pixels of the solid lines on the left and right of the cell 41*a*, and it is determined that there is no dotted line candidate spot.

FIG. 6B presents the vertical pixel histogram and the vertical pixel histogram for the cell 41*b* of the payee section in FIGS. 5A and 5C. In this case, the horizontal pixel histogram created by counting the pixels of the same color in the horizontal direction has a peak whose height is about half of that of the peak values of the solid lines on the top and bottom, and that part is extracted as a dotted line candidate spot. For the vertical pixel histogram, while pixels of the dotted line part appears in the histogram, the peak values are much smaller than the peak values of the pixels of the solid lines on the left and right of the cell 41, and not extracted as a dotted line candidate spot. To determine whether or not peak values of pixels are a dotted line candidate, for example, peak values of equal to or larger than what percentage (in multiples of ten) of the peak values of the pixels of the solid line part of a cell are extracted as a dotted line candidate may be determined in advance.

FIG. 6C presents the horizontal pixel histogram and the vertical pixel histogram for the cell 42*b* of the payer section in FIGS. 5A and 5C. In this case, the horizontal pixel histogram has a peak value whose height is about half of that of the peak values of the solid lines on the top and bottom of the cell 42*b*, and that part is extracted as a dotted line candidate spot. While the vertical pixel histogram also have some peak values, the peak values are sufficiently small compared with the peak values of the solid lines on the left and right of the cell 42*b*, and not extracted as a dotted line candidate spot.

FIG. 6D presents the horizontal pixel histogram and the vertical pixel histogram for the cell 43*b* of the amount section in FIGS. 5A and 5C. In this case, while the horizontal pixel histogram has peak values whose height is equal to half or more than half of the peak values of the pixels of the solid lines on the top and bottom of the cell 43*b*, the peak values are determined as peak values for pixels of a character and the like other than a dotted line since the width of the peak values is large. In determining whether the peak values of pixels are for a dotted line or not, for example, a reference value for the width of peak values is determined in advance, and when the width of peak values are equal to or larger than the reference value, it is determined as for a character, and when the width of the peak values is smaller than the reference value, it is determined as for a dotted line.

The horizontal pixel histogram has a plurality of peak values that are equal to or larger than the reference value other than the peak values of the pixels of the left and right of the cell 43*b*, and those parts are extracted as dotted line candidate spots. In this case, since the dotted line has a blurry part, the vertical pixel histogram lacks a peak value equal to or more than the reference value at the location that is supposed to be extracted as a dotted line candidate, and that part is not extracted as a dotted line candidate spot at this stage.

FIG. 6E presents the horizontal pixel histogram and the vertical pixel histogram for the cell 44*b* of the handling charge section in FIGS. 5A and 5C. In the horizontal pixel histogram, only the peak values of the pixels of the solid lines on the top and bottom of the cell 44*b* are extracted, and no dotted line candidate spot is extracted. Meanwhile, the horizontal pixel histogram has the peak values of the solid lines on the left and right of the cell 44*b* and three peak values whose height is equal to or more than ½ of the peak values, and these values are extracted as a dotted line candidate spot since the width the peak values is small.

As described above, a dotted line candidate part may be estimated by creating the pixel histogram in the vertical direction and the pixel histogram in the horizontal direction for each cell.

Returning to FIG. 3, in step S16, rough features of the dotted lines collected in steps S13 and S14 are collected. Here, rough features are features used for secondary extraction of a dotted line candidate described later, and are referred to as rough features as they are not confirmed features of the dotted lines at this stage. As features of a dotted line candidate, for example, information including the length, thickness of the dotted line, the interval, the color of the dotted line, and so on is collected.

Figure 7:
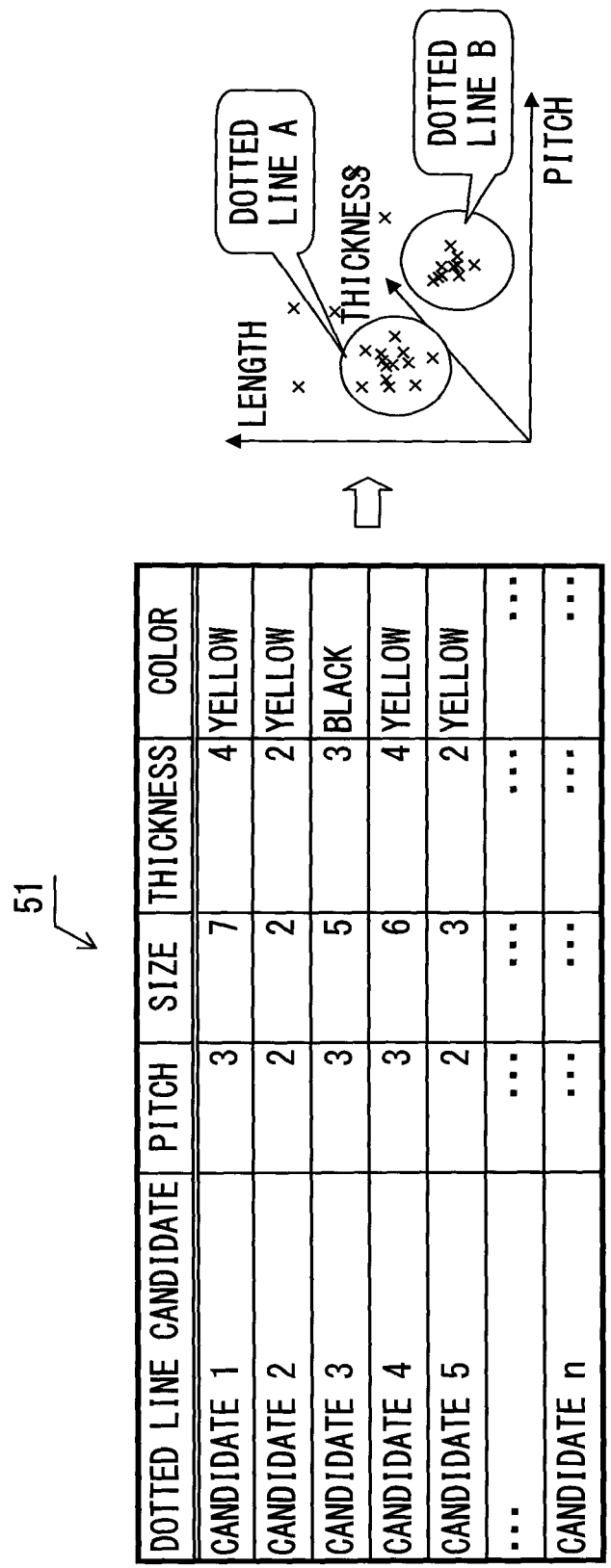
FIG. 7 is a diagram presenting an example of a primary feature table of dotted line candidates.

FIG. 7 is a diagram presenting a primary feature table 51 storing feature information of the dotted line candidates at the time of the primary extraction. FIG. 7 also presents a diagram illustrating grouping of the dotted line candidates into groups based on the feature information.

In the primary feature table 51, the candidate number specifying a dotted line candidate, the pitch of the dotted line, the size (length), the thickness, the color of the dotted line are stored. In the primary feature table 51, data for all the dotted line candidates extracted by the primary extraction are stored.

In the case in which dotted line candidates have been extracted by the processes in steps S13-S16 described above, there is a possibility that dotted line candidates of actually the same pitch, the same length are extracted as dotted line candidates of different pitches or different lengths due to a blur or missing in pixels. Therefore, in the embodiment, dotted line candidates are plotted on a two dimensional plane as presented in FIG. 7, to estimate, according to their distribution, dotted line candidates that are likely to belong to the same group, and the representative value of each group is calculated.

In the graph on the right of FIG. 7, the respective dotted line candidates are positioned in on a two-dimensional plane where the longitudinal axis represents the length of the dotted line candidates and the lateral axis represents the pitch of the dotted lines, and a plurality of dotted line candidates within a certain area are estimated as dotted lines in the same group. In the example in FIG. 7, a given cluster of dotted line candidates within certain areas are sorted out into two groups of DOTTED LINE A and DOTTED LINE B. At this time, the representative value is calculated respectively for the pitch, the length, thickness and so on of the dotted lines of a plurality of dotted line candidates belonging to the same group, and the calculated representative values for the dotted line candidate of the respective groups are saved in a memory and the like. Other values than the body surface values, average values and dispersion and the like may also be saved.

Returning to FIG. 3, secondary extraction of dotted line candidates in the entirety of the form is performed using the feature information collected by the primary extraction of dotted line candidates (S17). In the process in step S17, for example, dotted line candidates are collected again referring to the representative values, color, and the like of the dotted line candidates in the respective groups generated from the primary feature table 51.

Next, shape features are extracted from all the dotted line candidates extracted by the secondary extraction, and the extracted features are saved in a memory and the like as basic information including the thickness, length, pitch, density and so on of the dotted lines and supplemental information including the starting coordinates, color and information indicating the printing apparatus, and so on (S18).

The process in step S19 may be added to the process in step S18. In step S19, whether the shape of the dotted line is rectangular or circular is estimated, and the dotted line shape is saved in a memory as supplemental information. If there is a blurry part in the pixels of a dotted line scanned by a scanner and the like, the correct shape of the dotted line cannot be obtained, so the circumscribed rectangle, circumscribed figure of the dotted line is obtained, to estimate the shape of the dotted line. Meanwhile, information of the printing apparatus is saved as supplemental information because the tendency of blur, missing and the like in pixels differs depending on whether the printer used for printing the form was a laser printer, an inkjet printer or an impact dot printer.

The process in step S20 may be added to the process in step S18. In step S20, features of a broken line such as a dashed double-dotted line are extracted by evaluating the regularity of dot elements (the part with black pixels in the dotted line) and broken elements (the part with black pixels in the broken line).

FIG. 8 is a diagram presenting an example of a secondary feature table 53 of dotted line candidates. The secondary feature table 52 stores information including the candidate number specifying a dotted line candidate, the pitch of the dotted lines, the length (size), the dot shape, the starting coordinates, the color of the dotted lines, and so on.

In the example in FIG. 8, a new candidate 6 is extracted as a dotted line candidate by the secondary extraction by using the representative values of the groups as the optimal threshold values. Meanwhile, by estimating the shape of the dotted line, the size of the dotted line of the candidate 4 is changed to "7" from "6". Meanwhile, as a result of extraction focusing on the representative values, the candidate 3 is excluded from the dotted line candidates.

FIGS. 9A-9C are diagrams presenting shape features of a dotted line, the shape of a dotted line, shape features of a broken line, respectively.

As presented in FIG. 9A, for shape features of a dotted line, the thickness, length of a dotted line and the pitch of the dotted line are the basic information. Then, the starting coordinates, the color of the dotted line, the shape of the dot, the printing apparatus used are supplemental information.

FIG. 9B is an enlarged figure of a dot, which presents and example of a case in which a part of pixels forming a dot is blurry (or missing). In this case, the circumscribed rectangle of the dot is obtained, and the width and the height of the circumscribed rectangle are estimated and saved as the thickness and the length of the dot.

FIG. 9C presents a broken line consisting of two types of broken elements of different lengths. By comparing the regularity of the pitch and the like of the broken elements, whether or not they are an identical broken line may be determined.

Next, in step S21 in FIG. 4, the plurality of dotted line candidates extracted from the entirety of the form are sorted out into groups based on the feature information, and representative values of the feature information of dotted lines in the respective groups are calculated and saved in a memory. Specifically, dotted lines having similar lengths, pitches, shapes and colors and so on are sorted into the same group and representative values for them are calculated. As a grouping method, the same method as for the primary extraction may be used.

As a variation example for step S21, the principal component classification method presented in step S22 may be applied to sort out the dotted line candidates into groups. The principal component classification method is a method in which data distributed on a two dimensional plane is divided into two in the direction in which the breadth of the distribution increases, and divided at a position in the direction orthogonal to the dividing straight line that is appropriate for division into two groups.

FIGS. 10A and 10B are diagrams illustrating the classification method of dotted line candidates. FIG. 10A presents the distribution of dotted line candidates in a two dimensional plane where the longitudinal axis represents the length of dotted lines and the lateral axis represents the pitch of dotted lines. In this case, since it is assumed that dotted line candidates in the same group are within a certain area, classification into groups of two types of dotted lines including DOTTED LINE A and DOTTED LINE B can be performed.

FIG. 10B is a diagram illustrating the primary component classification method. The extracted dotted line candidates are plotted on a two dimensional plane where the longitudinal axis represents the length of dotted lines and the lateral plane represents the pitch of dotted lines, and a straight line k1 that maximizes the breadth of the distribution of the dotted line candidate cluster is obtained. Then, a straight line k2 that is orthogonal to the straight line k1 and is appropriate for division into two groups is identified. By performing division with the straight line k2, the dotted line candidate cluster can be classified into two groups.

Returning to FIG. 4, dotted line candidates in a specified area are evaluated in step S23. In the process in step S23, feature information (basic information, supplemental information) of dotted lines sorted into groups by the secondary extraction (hereinafter, referred to as a reference dotted line) and feature information of dotted line candidates in a specified area are compared, to judge whether the feature information of them matches or not. A specified area is, for example, a ruled area in which numbers being the recognition target are printed or hand-written.

As a variation example of step S23, the process in step S24 may be performed. In the process of step S24, in the case where the number of extracted dotted line candidates is small, a dotted line database (DB) storing shape feature and the like of dotted lines of forms that appeared previously is referred to, and compared with dotted line candidates.

Next, in step S25, a dotted line in the specified area is identified. In the process in step S25, when the feature information of the shape and the like of a dotted line candidate in the specified area matches with the feature information of the reference dotted line, the dotted line candidate is determined as an identical dotted line as the reference dotted line. On the other hand, if the feature information of the shape and the like of them do not match, re-evaluation is made at the image level. In the case of no match even at the image level, the form is rejected as the form cannot be recognized. In the re-evaluation at the image level, for example, the image of a dotted line candidate being the recognition target and the image of the reference dotted line extracted by the secondary extraction are laid on top of each other, and whether or not the agreement rate of the images is equal to or larger than a reference value. If the agreement rate is equal to or larger than the reference value, the dotted line candidate in the specified area is determined as an identical dotted line as the reference dotted line.

Next, in step S26, the dotted line candidate position is searched again. In the case where there are a number of overlapping parts of a dotted line and characters or in the case where a dotted line has a blurry part, a dotted line candidate that is supposed to be present may not be extracted even by the secondary extraction. In such a case, the position of a dotted line candidate is estimated referring to the interval between dotted line candidates (of reference dotted lines that represent the group of the dotted line candidates) in the same cell (or a relevant item cell). Then, the image data of the estimated location and the image data of the extracted dotted line candidate (or the reference dotted line) are compared at the image level.

Step S27 is a variation example of step S26, which is a process to estimate a dotted line candidate spot using a voting system. The voting system is a method in which values weighted with respect to intervals that are $\frac{1}{1}$ time, $\frac{1}{2}$ time, $\frac{1}{3}$ time an extracted interval are cast as votes, and the interval of the dotted lines is estimated from the cumulative total value of the number of votes. The process to estimate the interval of the dotted lines is described in detail later.

When the estimation of the dotted line candidates in the recognition target cell is completed, in the next step S28, image data for character recognition is created by deleting dotted lines while checking the color of the characters and the color of the dotted line candidates. At this time, the part in which a character and a dotted line overlap and the color is different from both the character color and the dotted line color is left.

In the next step S29, character recognition is performed using the image data generated by deleting dotted lines. When the character recognition process is completed, notification of box information including dotted line information (basic information, supplemental information of dotted lines) and a character recognition result 33 is performed.

Figure 11:
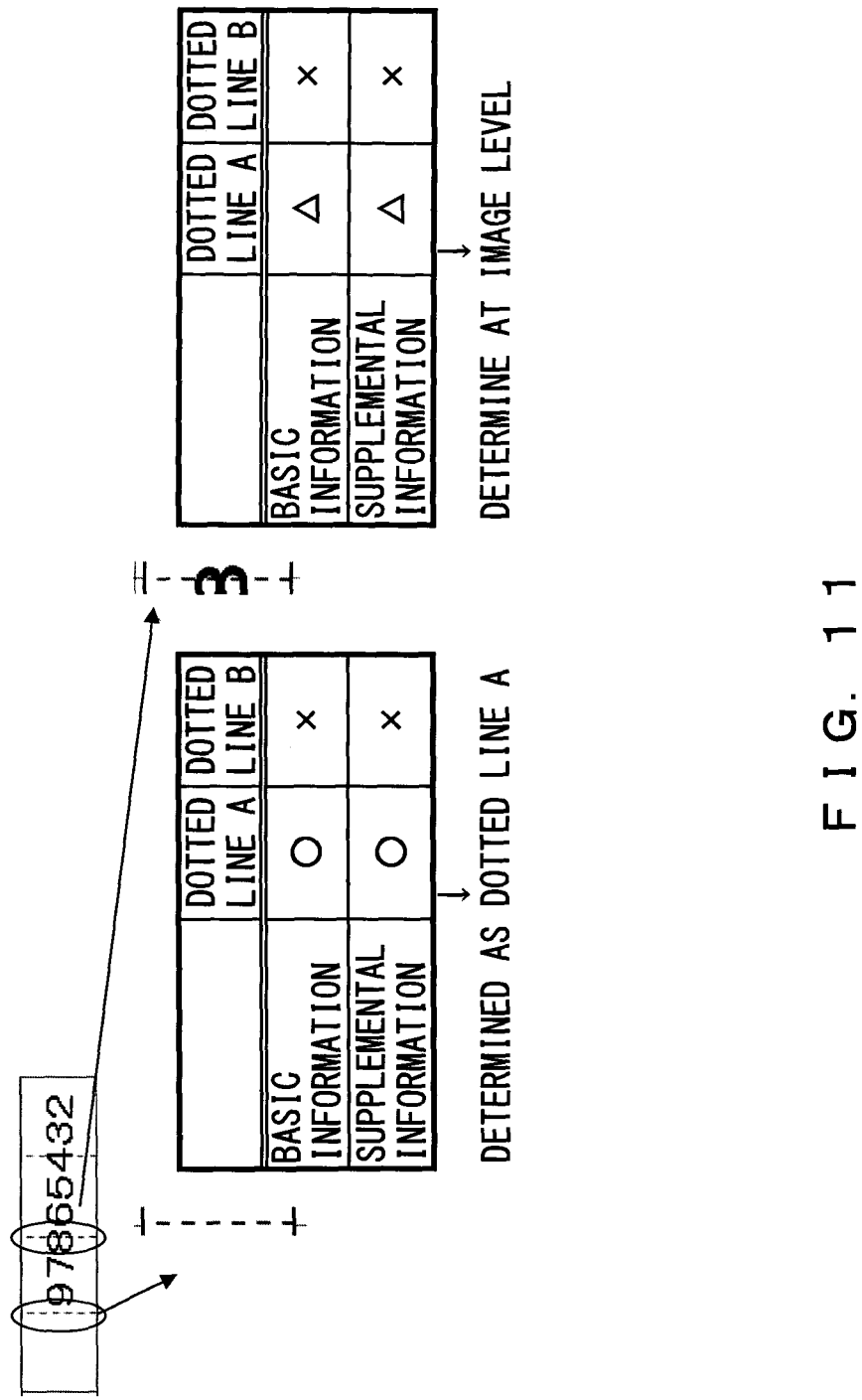
FIG. 11 is a diagram illustrating a comparison method of dotted lines.

Examples of the processes in steps S23-S30 described above are explained with reference to FIG. 11-FIG. 14. FIG. 11 is a diagram illustrating a case in which feature information of a dotted line candidate and feature information of a reference dotted line are compared.

An extracted dotted line candidate is compared with the basic information and the supplemental rope information of reference dotted lines A, B, for the leftmost dotted line candidate in the specified area including numbers in FIG. 11, the dotted line does not overlap with the number, and it which dotted line is identical to it may be determined by comparing it with the feature information of the reference dotted lines. In this case, the feature information of the dotted line candidate match with the feature information of the dotted line A (match is indicated with ○ in FIG. 11), and the dotted line candidate is determined as identical with the dotted line A.

The dotted line candidate at the position overlapping with "8" to its right does not match with the feature information of the dotted line A and dotted line B, and the type of the doted line cannot be identified by comparison of feature information only. The comparison results are presented in FIG. 11 with Δ and x. When the type of the dotted line cannot by identified by comparison of feature information, comparison at the image level is performed.

Figure 12:
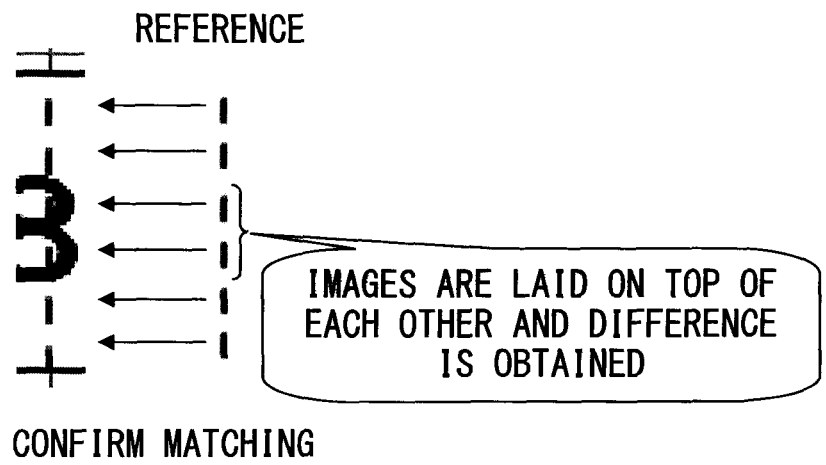
FIG. 12 is a diagram illustrating a comparison method at the image level.

FIG. 12 is a diagram illustrating the case of comparing a dotted line candidate at the image level. In this case, the image overlapping with a number and the image of the reference dotted line are laid on top of each other and the difference is obtained, to determine whether or not the images match. If the agreement rate of the images is equal to or larger than a reference value, the dotted line candidate is determined as identical with the compared reference dotted line.

FIGS. 13A and 13B are diagrams illustrating an estimation method of a dotted line candidate in the case in which the dotted line has a blurry part and furthermore, the dotted line overlaps with a number.

FIG. 13A is an example of a case in which two dotted line candidates are extracted at a predetermined interval b in the cell 43b in which numbers are printed, but no dotted line candidate is extracted at the third position.

In this case, assuming that dotted lines are placed at a predetermined interval, it is estimated that a dotted line candidate exists at the 3×b position from the left. Then, as illustrated in FIG. 13B, comparing the image of the first or second dotted line (reference dotted line) in the same cell and the blurred image at the image level, it is understood that a part of pixels exists at the position on which pixels seem to exist, with a high similarity of the interval of the pixels of the dotted line. Therefore, it is estimated that at the position overlapping with the number "4", the same dotted line candidate as its immediate left dotted line candidate exists.

Accordingly, even in the case in which a dotted line candidate cannot be extracted due to a blurry part in pixels or overlap with a character, the position of a dotted line may be estimated.

FIGS. 14A and 14B are diagrams presenting an overlapping part of a character and a dotted line, and image data after elimination of dotted lines.

Since the color of the part in which a character and a dotted line overlap (the orthogonal intersecting part in FIG. 14A is the color in which the character color and the dotted line color are blended and differs from the color of the dotted line, the part may be left without elimination. As a result, as illustrated in FIG. 14B, only the dotted lines are deleted, and the numbers "97865432" remain as image data.

Figure 15:
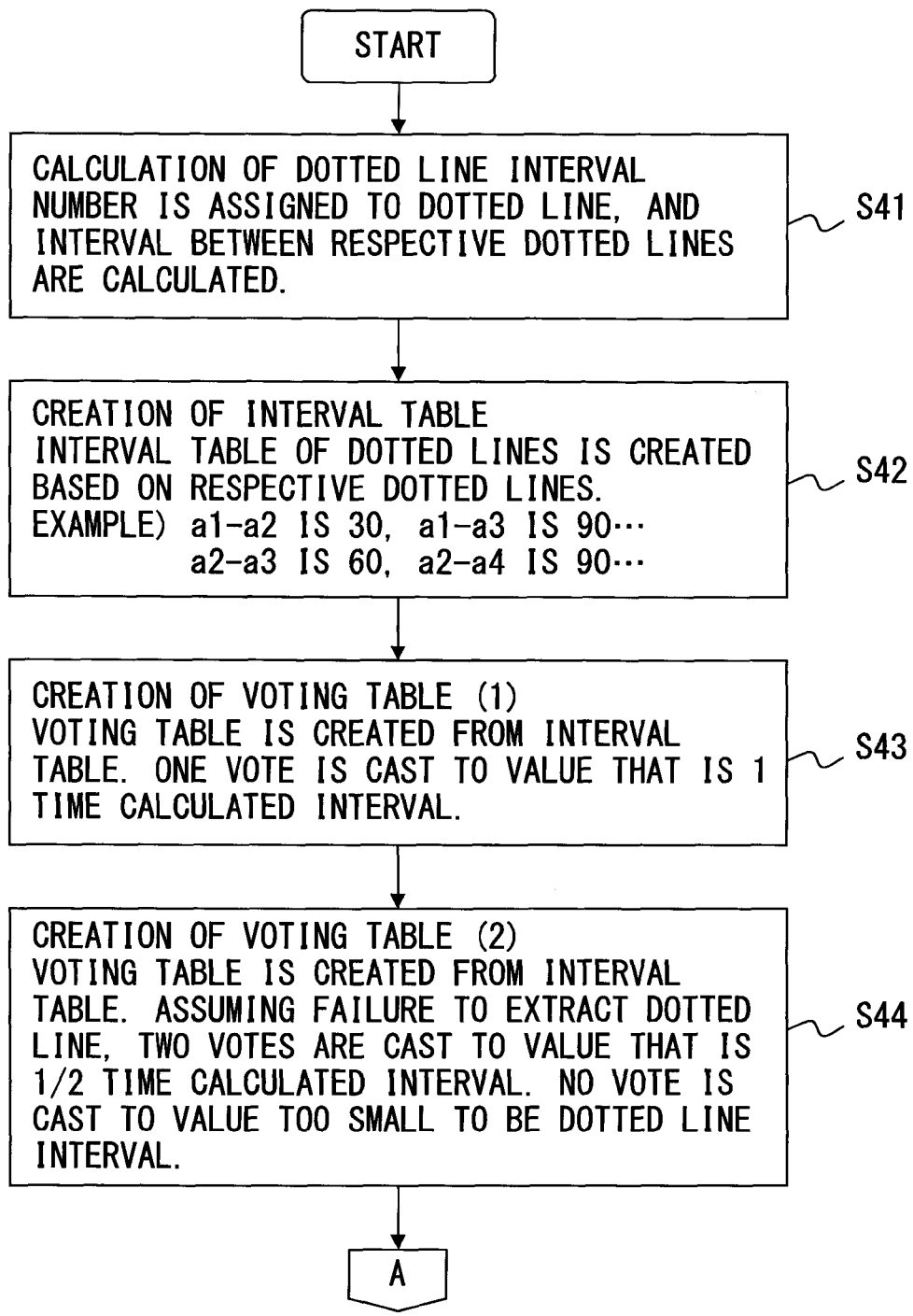
FIG. 15 is a flowchart (1) of a dotted line candidate estimation process by a voting system.
Figure 16:
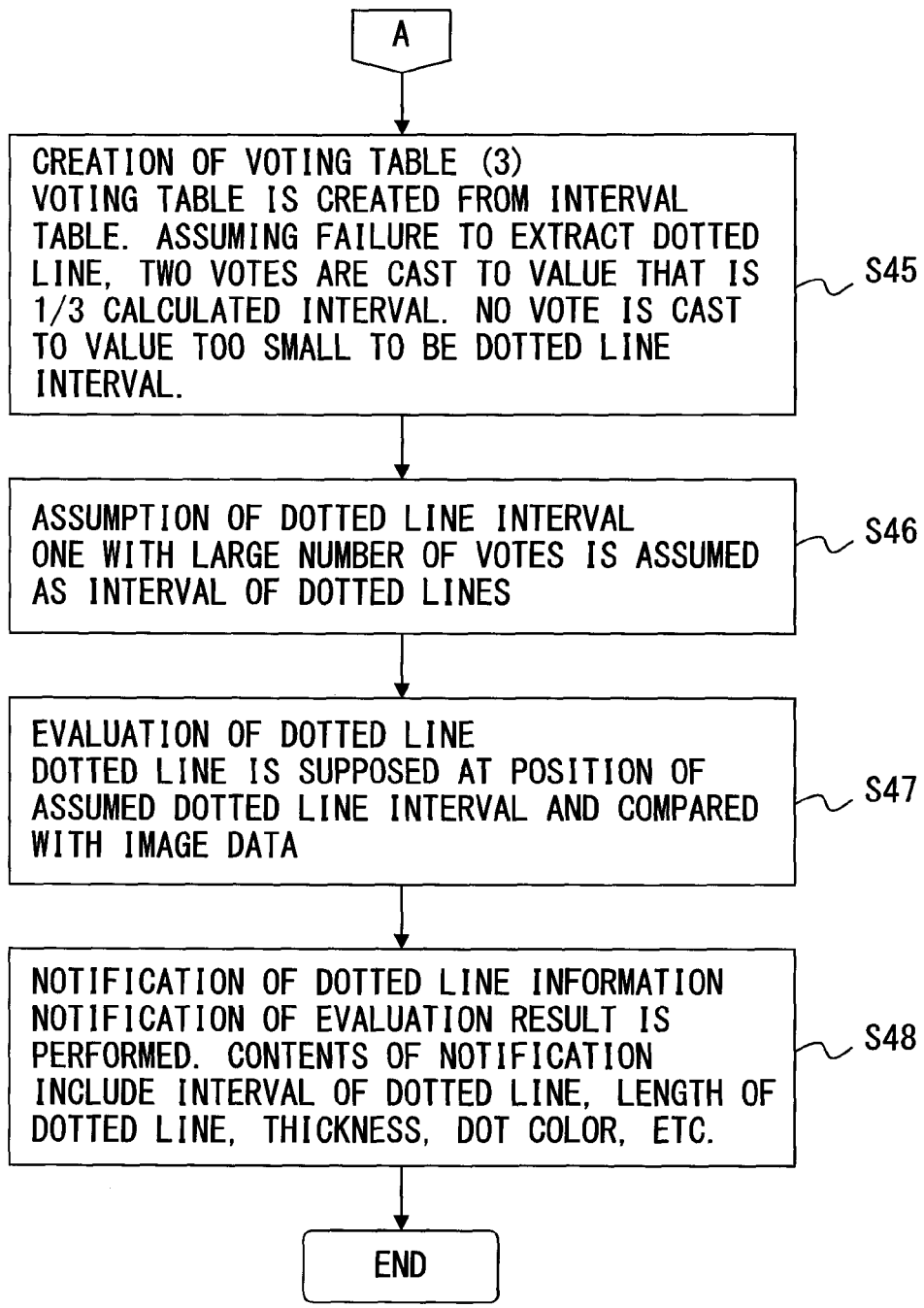
FIG. 16 is a flowchart (2) of a dotted line candidate estimation process by a voting system.

FIG. 15 and FIG. 16 are detailed flowcharts of a dotted line candidate estimation process by the voting system in step S27.

In step S41 in FIG. 15, a number is assigned to each dotted line candidate in a specified area (a cell being the recognition target in which numbers are printed), and intervals between the dotted line candidates are calculated. Since the dotted line candidates from the entirety of the form have been extracted by the primary extraction and the secondary extraction of dotted line candidates described above, the intervals between dotted line candidates in a specified cell may be calculated.

Next, in step S42, an interval table of dotted line candidates in a cell is created. The interval table presents intervals based on the solid lines of the outer circumference of the cell or each dotted line candidate. For example, when dotted line candidates a2-a9 presented in FIG. 18(A) are extracted from a cell presented by (a) and (b) in FIG. 17, intervals between the respective dotted line candidates are calculated, and an interval table 61 presented in FIG. 18B is created. In the example of FIG. 18B, the interval between a solid line a1 and the dotted line candidate a2 is "30 mm", and the interval between the dotted line candidate a1 and the dotted line candidate a3 is "90 mm". The dotted line candidates a2-a3 have a "60 mm" interval, and a2-a4 has a "90 mm" interval.

In steps S43 and S44, a voting table is created based on the interval table created in step S42. In step S43, one vote is cast for the value that is ⅟₁ time the interval in the created interval table. In step S44, assuming failure to extract a dotted line, two votes are cast for the value that is ½ time the interval in the interval table. At this time, no vote is cast for too small a value to be a dotted line interval.

Next, in step S45 in FIG. 16, assuming failure to extracted a dotted line, three votes are cast for the value that is ⅓ time the interval in the interval table. At this time, no vote is cast for too small a value to be a dotted line interval.

As a creating method for a voting table, for example, one vote is cast for the value that is ⅟₁ time each interval in the interval table 61 in FIG. 18B, two votes are cast for the value that is ½ time, three votes are cast for the value that is ⅓ time, and the cumulative total value of the number of votes for each interval is calculated. The interval that has the largest cumulative total value of the number of votes in the voting table is estimated as the correct interval between the dotted lines.

Next, in step S46, supposition of a dotted line interval is made. In the process in step S46, one for which the number of votes is the largest in the voting table is supposed as the interval of the dotted lines.

In the next step S47, a dotted line is assumed at the position of the supposed dotted line interval, and compared with the actual image data.

In step S47, if the agreement rate of the assumed dotted line and the image data is equal to or larger than the reference value, in step S48, notification of the thickness, length, interval of the dotted line, the dotted line color, the starting coordinates and the like of the estimated dotted line candidate is performed.

Figure 17:
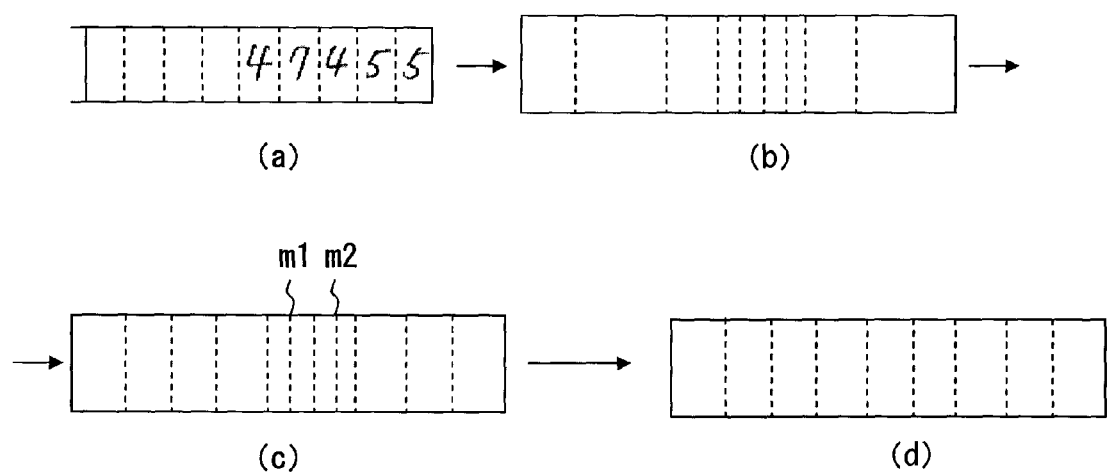
FIG. 17 is a diagram illustrating complement and deletion of dotted line candidates.
Figures 18A, 18B:
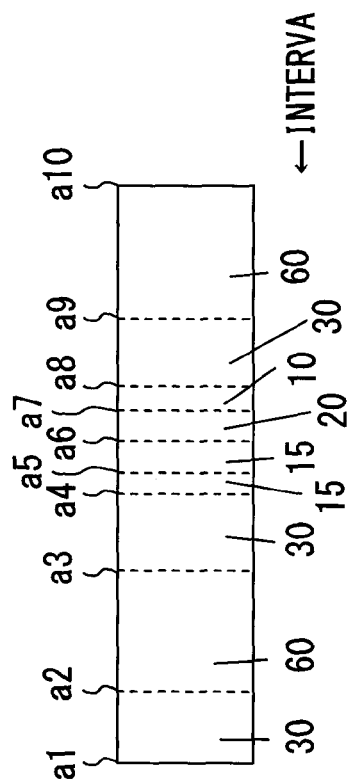
FIGS. 18A and 18B are diagrams presenting gaps between dotted lines and a gap table, respectively.

FIG. 17 is a diagram illustrating complement and deletion of a dotted line candidate by the voting system. FIG. 17 presents an example of the case in which dotted line candidates are not extracted at some positions, and dotted line candidates are extracted at positions at which they do not originally exist.

FIG. 18A presents intervals between dotted lines in a character box in FIG. 17, and FIG. 18B presents the interval table 61 based on the intervals between the dotted lines.

As illustrated in FIG. 18A, the interval between the leftmost solid line a1 of the character box and the dotted line candidate a2 is 30 mm, and the interval between the dotted line candidate a2 and the dotted line candidate a3 is 60 mm. In addition, the interval between the dotted line candidate a3 and the dotted line candidate a4 is 30 mm. The interval table 61 presented in FIG. 18B can be created by calculating each interval based on the solid line a1 and each dotted line candidate a2-a9.

As illustrated in FIG. 18B, the intervals based on the solid line a1 and each dotted line a2, a3, a4, . . . a9 and the solid line a10 are "30", "90", "120", . . . "270".

Meanwhile, the intervals based on the dotted line a1 and each dotted line a3, a4, a5, . . . a9 and the solid line a10 are "60", "90", "105", . . . "240".

FIG. 19 presents an example of the voting table 62 created based on the interval table 61. For example, for the interval "10", the number of vote for the ⅟₁-time value is "1", the number of votes for the ½-time value is "2", the number of votes for the ⅓-time value is "15", and the cumulative total value of the number of votes for the interval "10" is "18". The number of votes is respectively set depending on which of ⅟₁-time, ½-time, ⅓-time each interval in the interval table 61 corresponds to, and the cumulative total value is calculated.

In the example in FIG. 19, since the cumulative total value "32" for the interval "30" is the largest, the dotted line interval is estimated as "30". The dotted line candidate spot may be estimated by performing comparison at the image level for the position on which a dotted line is estimated to be present, referring to the estimated dotted line. In the example illustrated by (c) in FIG. 17, a dotted line candidate is complemented at the position in the middle of the dotted line interval "60". In addition, in the example presented by (d) in FIG. 17, dotted line candidates m1, m2 are deleted since they do not conform to the dotted line interval "30".

According to the embodiment described above, even in the case in which a dotted line cannot be extracted due to overlap of a character and a dotted line, or in the case in which the dotted line has a blurry part, a dotted line candidate spot may be estimated referring to feature information of another dotted line in the same character box, or feature information of a dotted line in a character box of another relevant item. Accordingly, dotted lines may be certainly eliminated from image data including dotted lines and characters, to increase the character recognition rate. In addition, since there is not that much need to create definition information of a character box in advance, the workload of the operator may be lightened.

Furthermore, when the voting system is used, a dotted line candidate spot may be estimated based on the interval between dotted lines in the same character box. Accordingly, dotted lines may be eliminated from the character box to increase the character recognition rate.

While the embodiment above has been described with an example of color image data, it may also be applied to white and black image data.

What is claimed is:

1. A character recognition apparatus comprising:
   extraction unit extracting a dotted line candidate from image data of a form;
   feature collection unit collecting a thickness, length, interval of a dotted line of a plurality of extracted dotted line candidates as feature information;
   estimation unit estimating a dotted line candidate spot in a character box being a recognition target based on the feature information of a dotted line candidate in a same character box being the recognition target or in another character box;
   elimination unit eliminating the dotted line candidate extracted by the extraction unit and the dotted line candidate estimated by the estimation unit from the image data; and
   character recognition unit performing recognition of a character in image data from which the dotted line candidate has been eliminated by the elimination unit,
   wherein the estimation unit estimates a dotted line candidate spot and a type of a dotted line candidate in the character box being the recognition target, using the feature information of a dotted line candidate in the same character box being the recognition target or in another character box and information indicating an interval between a dotted line candidate in the character box being the recognition target and a dotted line candidate in a same character box as the character box being the recognition target or in another character box.

2. A character recognition apparatus comprising:
   extraction unit extracting a dotted line candidate from image data of a form;
   feature collection unit collecting a thickness, length, interval of a dotted line of a plurality of extracted dotted line candidates as feature information;
   estimation unit estimating a dotted line candidate spot in a character box being a recognition target based on the feature information of a dotted line candidate in a same character box being the recognition target or in another character box;
   elimination unit eliminating the dotted line candidate extracted by the extraction unit and the dotted line candidate estimated by the estimation unit from the image data; and
   character recognition unit performing recognition of a character in image data from which the dotted line candidate has been eliminated by the elimination unit,
   wherein the estimation unit estimates whether or not there is a dotted line candidate not extracted yet in the character box being the recognition target, using an interval between a plurality of dotted line candidates in the character box being the recognition target or another relevant character box, and if it is estimated that there is a dotted line candidate, image data of a position on which a dotted line is estimated to be present in the image data and image data of a reference dotted line obtained from a plurality of dotted line candidates are compared, and when an agreement rate of the image data is equal to or larger than a reference value, it is estimated that a same dotted line candidate as the reference dotted line exists on the estimated position.

3. A character recognition apparatus comprising:
   extraction unit extracting a dotted line candidate from image data of a form;
   feature collection unit collecting a thickness, length, interval of a dotted line of a plurality of extracted dotted line candidates as feature information;
   estimation unit estimating a dotted line candidate spot in a character box being a recognition target based on the feature information of a dotted line candidate in a same character box being the recognition target or in another character box;
   elimination unit eliminating the dotted line candidate extracted by the extraction unit and the dotted line candidate estimated by the estimation unit from the image data; and
   character recognition unit performing recognition of a character in image data from which the dotted line candidate has been eliminated by the elimination unit,
   wherein the estimation unit creates an interval table representing intervals between dotted line candidates using intervals between dotted line candidates according to intervals between a plurality of dotted line candidates extracted in a same character box; assigns a different number of votes respectively to values that are 1 time, (1/n) time an interval in the interval table; obtains a cumulative total of a number of votes for each interval in the interval table and estimates an interval whose cumulative total value is largest as an interval between the dotted line candidates.

4. A character recognition method comprising:
   extracting a dotted line candidate from image data of a form;
   collecting and storing, in storing means as feature information, a thickness, length, interval of a dotted line of a plurality of extracted dotted line candidates;
   estimating a dotted line candidate spot in a character box being a recognition target, based on the feature information of a dotted line candidate in a same character box being the recognition target or in another character box;
   eliminating the extracted dotted line candidate and the estimated dotted line candidate from the image data; and
   performing recognition of a character in image data from which the dotted line candidate has been eliminated,
   wherein a dotted line candidate spot and a type of a dotted line candidate in the character box being the recognition target are estimated, using the feature information of a dotted line candidate in the same character box being the recognition target or in another character box and information indicating an interval between a dotted line candidate in the character box being the recognition target and a dotted line candidate in a same character box as the character box being the recognition target or in another character box.

5. A character recognition method comprising:
   extracting a dotted line candidate from image data of a form;
   collecting and storing, in storing means as feature information, a thickness, length, interval of a dotted line of a plurality of extracted dotted line candidates;
   estimating a dotted line candidate spot in a character box being a recognition target, based on the feature information of a dotted line candidate in a same character box being the recognition target or in another character box;

eliminating the extracted dotted line candidate and the estimated dotted line candidate from the image data; and performing recognition of a character in image data from which the dotted line candidate has been eliminated, wherein whether or not there is a dotted line candidate not extracted yet in the character box being the recognition target is estimated, using an interval between a plurality of dotted line candidates in the character box being the recognition target or another relevant character box, and if it is estimated that there is a dotted line candidate, image data of a position on which a dotted line is estimated to be present in the image data and image data of a reference dotted line obtained from a plurality of dotted line candidates are compared, and when an agreement rate of the image data is equal to or larger than a reference value, it is estimated that a same dotted line candidate as the reference dotted line exists on the estimated position.

6. A character recognition method comprising:

extracting a dotted line candidate from image data of a form;

collecting and storing, in storing means as feature information, a thickness, length, interval of a dotted line of a plurality of extracted dotted line candidates;

estimating a dotted line candidate spot in a character box being a recognition target, based on the feature information of a dotted line candidate in a same character box being the recognition target or in another character box;

eliminating the extracted dotted line candidate and the estimated dotted line candidate from the image data; and performing recognition of a character in image data from which the dotted line candidate has been eliminated, wherein an interval table representing intervals between dotted line candidates is created, using intervals between dotted line candidates according to intervals between a plurality of dotted line candidates extracted in a same character box; a different number of votes is assigned respectively to values that are 1 time, (1/n) time an interval in the interval table; a cumulative total of a number of votes for each interval in the interval table is obtained and an interval whose cumulative total value is largest is estimated as an interval between the dotted line candidates.

* * * * *